Dec. 31, 1957     R. W. GRAHAM     2,818,051
ROTATING DEVICE

Filed Dec. 21, 1954     2 Sheets-Sheet 1

INVENTOR
Robert W. Graham
BY
S. C. Thorpe
ATTORNEY

Dec. 31, 1957   R. W. GRAHAM   2,818,051
ROTATING DEVICE
Filed Dec. 21, 1954   2 Sheets-Sheet 2
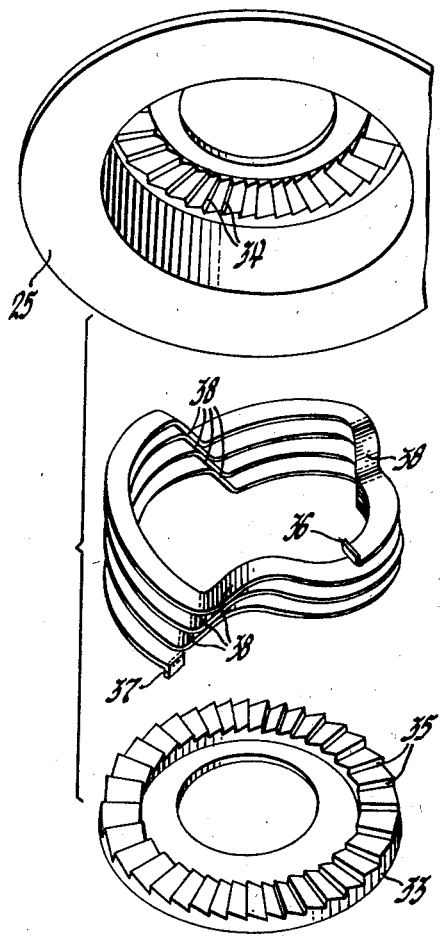
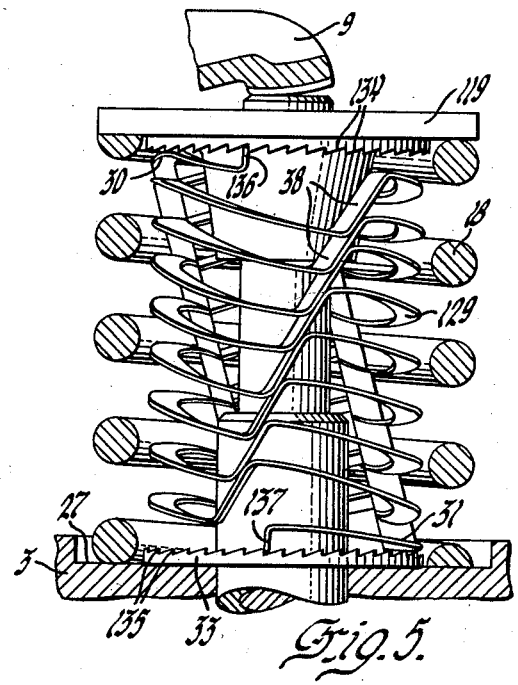
Fig. 5.
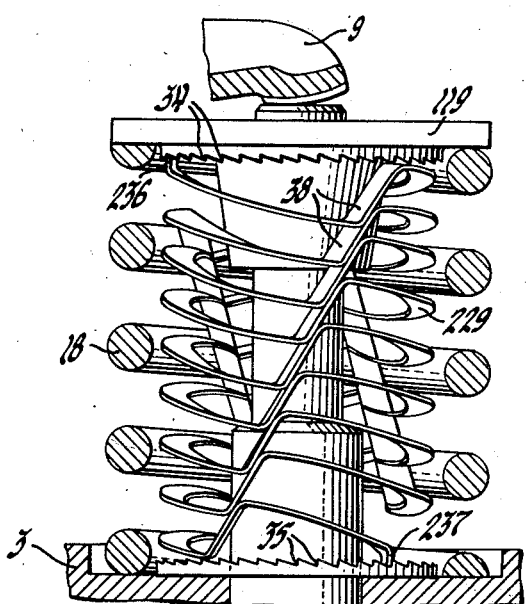
Fig. 6.
INVENTOR
Robert W. Graham
BY
J. C. Thorpe
ATTORNEY

United States Patent Office 2,818,051
Patented Dec. 31, 1957

2,818,051

ROTATING DEVICE

Robert W. Graham, Grosse Pointe, Mich., assignor to General Motors Corporation, Detroit, Mich., a corporation of Delaware Application December 21, 1954, Serial No. 476,692

12 Claims. (Cl. 123—90)

This invention relates to devices for imparting progressive rotation to relatively reciprocating and rotatable members such as, for example, poppet valves and their guiding or supporting structures in internal combustion engines.

The invention in its broadest aspects concerns a coil spring having a plurality of convolution with partions of adjacent convolutions slidably coacting during flexure of the spring to rotatively drive the respective ends of the spring relative to each other.

More specifically, the invention has as its object to provide an improved rotating device for reciprocating elements such as engine poppet valves, and employing a spring of the aforementioned type as a means for imparting a positive rotative force to the valve during one direction of its axial movement, together with connecting means between said spring and the valve or other associated part of the engine whereby such rotative force is utilized in only one direction about the valve axis.

A further object of the invention is to improve the valve rotating device of Leach Patent 2,613,656 by the addition of the aforesaid spring and connecting means and thereby obtain a positive rotative force without dependence therefor on the inherent winding and unwinding action of the main valve return coil spring of conventional type as disclosed in said patent.

The means by which these and other objects of the invention are carried out will be readily apparent from the following description of various structural embodiments illustrated in the drawings wherein:

Figure 4 is an exploded view of the rotator spring and the ratchet toothed end engaging members shown in Figures 2 and 3.

Figure 5 shows a modified form of the invention.

Figure 6 shows a further modified form of the invention.

Figure 1:
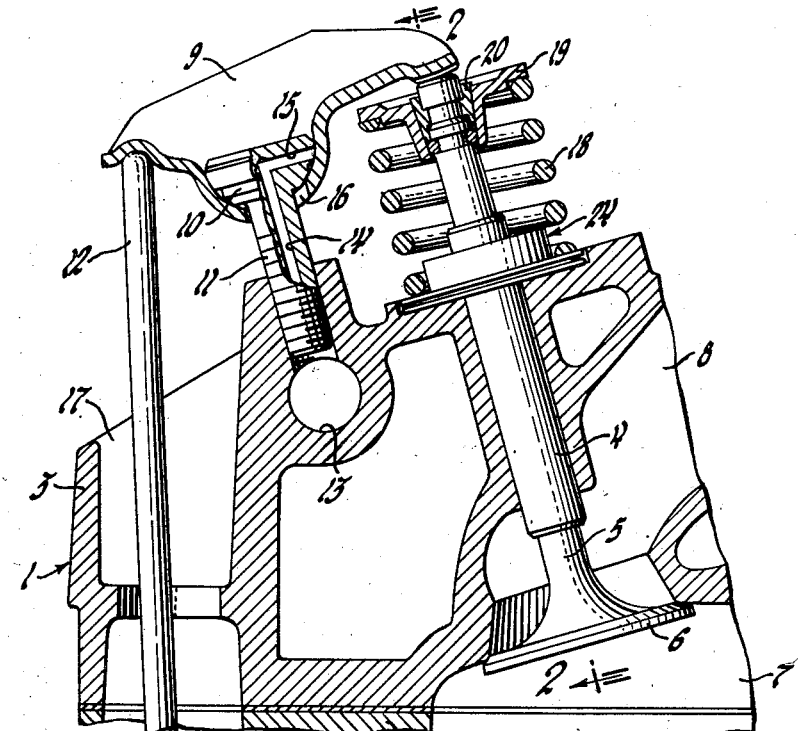
Figure 1 is a transverse view of a portion of an internal combustion engine with parts broken away and in section, showing one form of my device applied for effecting valve rotation.

Referring now to the drawings in detail and particularly to the Figures 1–4, the numeral 1 designates generally the frame of an internal combustion engine of the valve-in-head type including a cylinder block 2 and cylinder head 3. Guided for reciprocation and rotation by a bushing 4 fixed in the cylinder head is the stem 5 of a poppet valve 6 which normally closes communication between the engine combustion chamber 7 and the valve port 8. Valve reciprocating means as illustrated includes a rocker 9 oscillating about a spherical bearing 10 formed as the head of a stud 11 extending fixedly from the cylinder head. One end of the rocker 9 is actuatable by a push rod 12, and the other end of the rocker actuates the stem 5 of the valve, causing it to move downwardly from its closed position shown in Figure 1 to its open position in which the port 8 and combustion chamber 7 are connected.

Lubrication for the surfaces of the rocker, and its bearing surfaces on the push rod 12, stud 11 and valve stem 5 may be supplied in any desired manner, however, as illustrated such is supplied by the oil gallery 13 in the cylinder head which connects with drilled passages 14 and 15 in the stud. Oil from the engine lubricating pump (not shown) may thus flow through the oil gallery 13 and the passages 14 and 15 to the upper surfaces of the rocker 9 and thence be carried by the oscillating movement of the rocker to the aforementioned bearing surfaces. Excess lubricating oil is permitted to drain through the enlarged aperture 16 in the rocker, through which extends the stud 11, down on to the cylinder head 3 and from there through such passages as 17 surrounding the push rod to the inlet of the pump via the engine crankcase (not shown). Movement of the valve in the opening direction is opposed by a conventional coil spring 18 or any other return means for biasing the valve closed. One end of this coil return spring is connected to move with the valve stem 5 through a conventional retainer in the form of a washer 19 fixed to the stem by split locks 20 in a manner well known to the art. The opposite end of the spring 18 reacts against the cylinder head 3, being spaced therefrom by the valve rotating device designated generally by the numeral 24 and now to be described.

Figure 2:
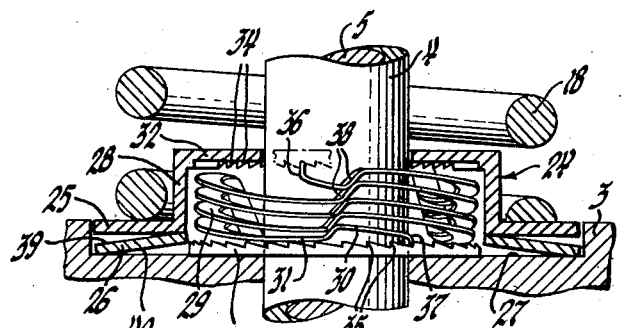
Figure 2 is an enlarged fragmentary view similar to Figure 1, showing the parts in greater detail in the valve "closed" condition.

As shown in Figure 2, the rotating device 24 includes a retainer member 25 on which is seated the lower end of the coil spring 18 and rests, in turn, on a Belleville spring 26 abutting an annular surface 27 on the cylinder head about the valve guide 4. The retainer member 25 is of generally washer-like form having its central portion upraised to form a housing 28 about a second coil spring 29. This second coil spring is preferably made of rectangular section wire and has a plurality of convolutions including its respective end convolutions 30 and 31 which thrustably abut opposing clutch surfaces formed on the inner upper wall 32 of the housing and a ring 33 seated on the cylinder head surface 27. As shown, these clutch surfaces comprise oppositely presented ratchet teeth 34 and 35, respectively, which are engaged by the pawl-like terminating ends 36 and 37 of the end convolutions 30 and 31, respectively, of the second coil spring 29. The arrangement is such that the upper ratchet teeth 34 prevent rotation of the retainer member 25 in a counterclockwise direction (looking axially downward of the valve as viewed in Figure 2) relative to the second spring 29, and the lower ratchet teeth 35 prevent counterclockwise rotation of the second spring 29 relative to the ring 33 and the cylinder head 3.

At least one pair of adjacent convolutions of the second spring 29 are crimped at one or more places about their circumference to effect a wave-like or undulated form. These undulations 38, as best shown in Figure 4, are of such length and are in angularly staggered relation to each other between convolutions, so that they present slidably coacting cam surfaces. Also, it is to be noted that the coacting cam surfaces extend helically of the axis of the spring with a helix angle greater than the general helix angle of the convolutions in which they are formed.

The lower ratchet toothed ring 33 is operatively fixed to the cylinder head, as by press fitting it over the valve guide 4. Under "normal" conditions, that is with the valve closed as shown in Figure 2, the Belleville spring 26 has a dished configuration such that its upper and lower end faces 39 and 40 are radially divergent to the under side of the retainer 25 and the cylinder head surface 27, respectively. Both the Belleville spring 26 and the second coil spring 29 are substantially weaker than the valve return main spring 18, so that each deflects under the increased thrust of the spring 18 during valve opening movement. The springs 26 and 29, however, have sufficient stiffness in combination to maintain the retainer 23 in its upraised position of Figure 2, against the thrust of the spring 18 in the valve closed condition.

Figure 3:
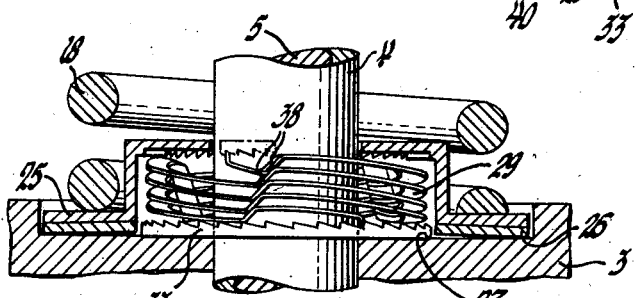
Figure 3 is a view like Figure 2 except with the parts shown in the valve "open" condition.

During operation, oil which normally coats the surface of the cylinder head is introduced between the retainer 25 and the upper surface of the Belleville spring when they are in their divergent relation of Figure 2. As the Belleville spring 26 deflects under increased load from the main spring 18 during valve opening, its upper surface 39 becomes parallel with the underside of the supporting retainer 25, resulting in the oil therebetween being momentarily trapped. This trapping of the oil between those surfaces provides lubrication which sufficiently reduces the frictional engagement of the retainer with Belleville spring to enable the retainer to freely rotate about the valve stem. Rotation of the retainer is effected by the second spring 29 and its undulations 38 which slidably coact with each other, causing the upper pawl end 36 to drivably engage the retainer clutch teeth 34 while the lower pawl end 37 is restrained from rotating by the teeth 35 on the ring 33. Such rotation and deflection of the Belleville spring and the second spring 29 continues until the valve reaches its fully open condition of Figure 3, whereupon the oil previously trapped between the retainer member 25 and the Belleville spring will have been substantially squeezed out, allowing their abutting surfaces to frictionally reengage each other. Such frictional engagement continues as the valve begins its return or upward stroke, preventing rotation of the retainer 25 while the pawls of the second spring 29 are free to ratchet over the teeth 34 and 35 as the spring 29 and the Belleville spring regain their initial configurations. Although the Belleville spring as shown in Figure 3 does not have its bottom end face entirely parallel with the cylinder head abutting surface 27 in the valve open condition, the Belleville spring may be selected of such strength as to be fully flat so as to mate with the cylinder head surface 27 at this time. In the latter event, the retainer member 25 may have its under surface slightly divergent to the upper face 39 of the Belleville spring in the valve fully open condition, or this retainer under surface may be of such configuration as to also conform to the Belleville upper face simultaneously with the Belleville lower face conforming with the cylinder head surface 27.

In the modification of Figure 5 the main return coil spring 18 seats at its lower end directly on the surface 27 of the cylinder head, and a second coil spring 129 of substantially the same length as the main spring 18 is employed which is generally similar to the previously described spring 29. The lower end convolution 31 of the second spring 129 again bears on a ring 33 and has a pawl 137 which engages one-way ratchet teeth 135 formed on this ring 33. The retainer washer 119 for the upper end of the spring 18 is provided on its lower face with oppositely-presenting ratchet teeth 134 which abut and ratchetably engage the upper pawl end 136 of the second spring. As shown, the second spring 129 in this modification is oppositely wound to that of the previously described spring 29, and the upper and lower clutch teeth 134 and 135 are in oppositely presenting relation to those of the previously described teeth 34 and 35, respectively. All convolutions of the second spring 129 are, moreover, similarly undulated as at 38 to provide coacting cam surfaces which impart relatively opposite rotation to the upper and lower pawls as the second spring is compressed with compression of the main spring during valve opening movements. Due to the reverse winding of this second spring 129 and the reverse direction of the ratchet teeth, the pawls 136 and 137 are free to slip over their respective teeth during valve opening movements, and engage the teeth only during the valve closing movements, with the result that rotation of the valve is produced during its closing movement instead of during opening.

Shown in Figure 6 is a modification of the Figure 5 construction wherein the second spring 229 is similarly wound to that of the first described spring 29, and its upper and lower pawl forming ends 236 and 237 engage ratchet teeth 34 and 35 respectively which provide rotation of the valve during its opening stroke. The operation of this form of the invention is otherwise the same as that of Figure 5.

It is to be noted that in both the Figure 5 and Figure 6 forms there is no utilization of an oil film surface to time the portions of the valve reciprocating cycle during which the second spring is effective to impart rotation. Thus, in both Figures 5 and 6, there is some tendency to obtain a retrograde rotation of the valve during the ratcheting stroke, which is prevented in the previous form of Figures 1–4, by the metal to metal engagement of the Belleville spring with the cylinder head and lower spring retainer 25. However, such retrograde rotation as will occur in the forms of Figures 5 and 6, as the result of friction tending to prevent the pawls from ratcheting over their teeth, will be found to be substantially less than the extent of positive rotation during the other half of the cycle, and the extended length of the second spring with its greater rotating stroke will ensure that positive rotation in one direction will always exceed the retrograde rotation.

Although only certain preferred embodiments of the invention have been illustrated and described, it is appreciated that various minor modifications of the parts may be made without departing from the spirit and scope of the invention as defined in the following claims.

I claim:

1. A coil spring having a plurality of convolutions in rotative camming relation with each other during axial flexure of the spring, and one-way rotary clutch means operatively associated with said spring for transmitting rotative movements of said convolutions relative to each other.

2. A helical coil spring having a plurality of axially adjacent convolutions with coacting surface portions in rotative camming engagement with each other during axial contraction of the spring, and one-way rotary clutch means operatively associated with said spring for transmitting rotative movements of said convolutions relative to each other.

3. A helical coil spring having a plurality of convolutions each with a plurality of circumferentially spaced undulations, the undulations of each said convolution being in angularly staggered relation to those of its adjacent convolution about the axis of the spring in its relatively relaxed condition, the circumferentially most adjacent undulations of adjacent convolutions being cammingly engageable with each other to effect their relative rotation about the spring axis in response to increased loading of the spring, and one-way rotary clutch means operatively associated with said spring for transmitting rotative movements of said convolutions relative to each other.

4. In combination, a coil spring having oppositely extending pawl-forming ends, relatively reciprocating members having spring axial loading surfaces in respectively opposite rotary one-way ratcheting engagement with said spring ends.

5. In combination, relatively reciprocable and rotatable members having oppositely facing annular surfaces with circumferentially spaced oppositely presenting ratchet teeth, and a helical spring resiliently connecting said members having end terminating pawls in one-way rotary driving engagement with said teeth and having a plurality of convolutions intermediate its ends, each with circumferentially spaced undulations rotatably camming on the undulations of its adjacent convolution to impart rotation to one of said pawls relative to the other about the spring axis.

6. A device for insertion thrustwise between two relatively reciprocated and rotatable members to impart progressive rotation to one of the members relative to the other during reciprocation, including elements fixedly associated with said members, said elements having annular surfaces mutually facing each other axially of the axis of rotation of said members, said surfaces being radially toothed to accommodate ratcheting movement of pawls thereon in respectively opposite directions about said axis and prevent such movement in reverse directions, and a helical coil spring resiliently spacing said members and terminating at its ends with oppositely directed pawls engaging said toothed surfaces, said spring having a pair of adjacent normally spaced convolutions with cam portions coacting with each other to rotatively move said pawls relative to each other about said axis in the direction to drivingly engage said teeth as said members approach each other along said axis.

7. A device for insertion thrustwise between two relatively reciprocated and rotatable members to impart progressive rotation to one of the members relative to the other during reciprocation, including elements fixedly associated with said members, said elements having annular surfaces mutually facing each other axially of the axis of rotation of said members, said surfaces being radially toothed to accommodate ratcheting movement of pawls thereon in respectively opposite directions about said axis and prevent such movement in reverse directions, and a helical coil spring resiliently spacing said members and terminating at its ends with oppositely directed pawls engaging said toothed surfaces, said spring having a pair of adjacent normally spaced convolutions with cam portions coacting with each other to rotatively move said pawls relative to each other about said axis in the direction to drivingly engage said teeth as said members move away from each other along said axis.

8. The combination with a poppet valve having a stem, means supporting the stem for axial rotation and reciprocation, and valve return means including a first coil spring reacting at one end against said supporting means and a retaining means for the other end of the spring on the stem, of a second coil spring arranged substantially coaxially with the first spring and provided at its respective ends with pawls having opposite one-way rotary bearing engagement with said supporting and retaining means, said second spring having a plurality of convolutions with coacting cam surfaces arranged to rotatively slide on each other about the stem in response to compression of said second spring during opening movements of the valve.

9. In combination, a poppet valve having a stem and valve return means including a coil spring, abutment means for one end of the spring and means supporting the stem for axial rotation and reciprocation, said spring having a plurality of convolutions including end convolutions thrustably bearing on said abutment and supporting means, respectively, each said end convolution terminating in a portion having ratchet engagement with said means on which its convolution bears to oppose their relative rotation about the stem in the direction tending to diametrically expand said end convolution while accommodating their relative rotation in the opposite direction, and coacting cam surfaces on at least one pair of adjacent convolutions of said spring engageable with each other during compression of the spring to impart relative rotary movement of the spring end portions about the stem in the direction accommodated by their said ratcheting engagement with the abutment and supporting means.

10. In combination, a poppet valve having a stem and valve return means including a coil spring, abutment means for one end of the spring and means supporting the stem for axial rotation and reciprocation, said spring having a plurality of convolutions including end convolutions thrustably bearing on said abutment and supporting means, respectively, each said end convolution terminating in a portion having ratcheting engagement with said means on which its convolution bears to oppose their relative rotation about the stem in the direction tending to diametrically expand said end convolution while accommodating their relative rotation in the opposite direction, and coacting cam surfaces on at least one pair of adjacent convolutions of said spring engageable with each other during compression of the spring to impart relative rotary movement of the spring end portions about the stem in the direction opposed by their said ratcheting engagement with the abutment and supporting means.

11. In combination with a poppet valve, valve reciprocating means including a return spring having one end connected to move with the valve, a rigid member supporting the valve for reciprocation and rotation, a Belleville spring encircling the valve and abutting said rigid member, a seating member for the opposite end of said return spring abutting said Belleville spring, said Belleville spring having its end faces normally divergent to both said members and being yieldable under increased thrust of the return spring during valve opening to a deflected condition in which one of said end faces is in substantial parallelism with the abutting surface of one of said members, means for introducing lubricant between said Belleville spring one end face and said one member while in divergent relation, and means rotatively driving said members relative to each other about the valve in response to deflection of said Belleville spring during valve opening.

12. The invention defined in claim 11, wherein said said last-named means includes a coil spring thrustably interposed between and having its respective ends in opposite rotary driving and ratcheting engagement with said members, said coil spring having a plurality of convolutions including two axially adjacent convolutions each having a portion thereof crimped to helically cam the other rotatively about the valve as said adjacent convolutions approach each other with deflection of said Belleville and return springs under increased load during valve opening.

References Cited in the file of this patent
UNITED STATES PATENTS

| | | |
|---|---|---|
| 1,250,585 | Johnson | Dec. 18, 1917 |
| 2,165,239 | Douglas et al. | July 11, 1939 |
| 2,441,167 | Raspet | May 11, 1948 |
| 2,516,795 | Norton | July 25, 1950 |
| 2,613,656 | Leach | Oct. 14, 1952 |
| 2,653,587 | Rasmussen et al. | Sept. 29, 1953 |